United States Patent [19]

Höptner et al.

[11] Patent Number: 4,845,667
[45] Date of Patent: Jul. 4, 1989

[54] METHOD AND APPARATUS FOR DATA EXCHANGE BETWEEN MICROPROCESSORS

[75] Inventors: Wolfgang Höptner, Uhingen; Gerhard Lotterbach, Markgröningen; Egbert Perenthaler, Stuttgart; Jan F. van Woudenberg, Schwieberdingen; Udo Zucker, Bonnigheim, all of Fed. Rep. of Germany

[73] Assignee: Robert Bosch GmbH, Stuttgart, Fed. Rep. of Germany

[21] Appl. No.: 249,267

[22] Filed: Sep. 22, 1988

Related U.S. Application Data

[63] Continuation of Ser. No. 810,937, Dec. 19, 1985, abandoned.

[30] Foreign Application Priority Data

Jan. 16, 1985 [DE] Fed. Rep. of Germany ....... 3501194

[51] Int. Cl.⁴ .............................. G06F 13/38
[52] U.S. Cl. ................. 364/900; 364/424.01; 370/60; 370/94
[58] Field of Search ............ 370/60, 94, 85, 89, 370/100; 364/200 MS File, 900 MS File, 424, 426; 379/88, 196, 211

[56] References Cited

U.S. PATENT DOCUMENTS

| | | | |
|---|---|---|---|
| 4,445,214 | 4/1984 | Reynolds et al. | 370/94 |
| 4,491,916 | 1/1985 | Vallhonrat | 364/200 |
| 4,493,049 | 1/1985 | Donohue et al. | 364/900 |
| 4,500,960 | 2/1985 | Babecki et al. | 364/200 |
| 4,527,252 | 7/1985 | Donohue et al. | 364/900 |
| 4,589,109 | 5/1986 | Chambers | 370/94 |
| 4,608,630 | 8/1986 | Schott | 364/200 |
| 4,646,261 | 2/1987 | Ng | 364/900 |
| 4,669,044 | 5/1987 | Houser et al. | 364/200 |

OTHER PUBLICATIONS

"Automotive Electronics", 1979, Motronic Technical Description.
"The Use of Microprocessors as Automobile On-Board Controllers", Aug. 1974, pp. 33-36.
"μCs on a chip and integrated d/a's about to usher in an IC harvest", Jan. 1977, Electronic Design, pp. 34-36.
*Microcontroller Handbook–Intel;* pp. 9-2, 9-3, 9-34, 9-35, 10-2, and 10-3.

Primary Examiner—Gary V. Harkcom
Assistant Examiner—Randy Lacasse
Attorney, Agent, or Firm—Frishauf, Holtz, Goodman & Woodward

[57] ABSTRACT

A method and apparatus for data exchange between a master microprocessor and a slave microprocessor, in which the connection is a parallel bus and the data exchange requires a minimum of time. For this purpose, the data are transmitted in a predetermined sequence and in which the transmission-start identifier is a signal train generated by the master processor which is specifically associated with data transmission. Preferably, a master processor and a slave processor are interconnected by the parallel data bus, with buffer memories, such as latches, interposed. A toggle flip-flop is connected to the interrupt input of the slave processor in such a way that merely placing a specific instruction (i.e. command+data) on the bus simultaneously notifies the slave processor to prepare for the exchange of data, thereby saving time.

16 Claims, 3 Drawing Sheets

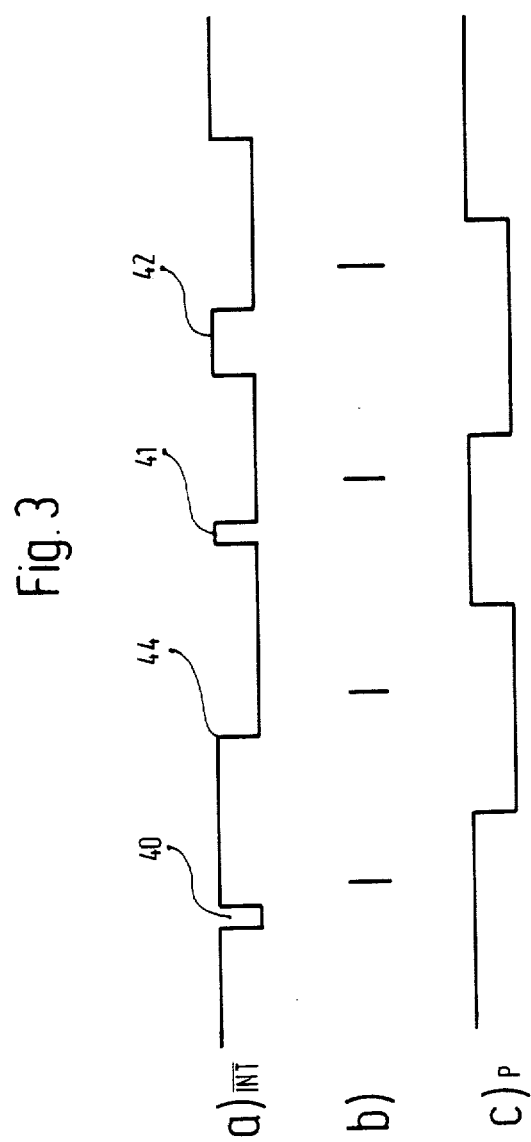

METHOD AND APPARATUS FOR DATA EXCHANGE BETWEEN MICROPROCESSORS

This application is a continuation of application Ser. No. 06/810,937, filed Dec. 19, 1985, now abandoned.

The present invention relates generally to a method of exchanging data between a master microprocessor and a slave microprocessor and, more particularly, to a method in which each packet of data exchange is preceded by a specific signal train generated by the master processor.

BACKGROUND

The coupling, as such, of two microprocessors together has long been known. Data transmission is carried out either serially, through a standard interface, or in parallel, over a so-called data bus. Serial coupling has the disadvantage that the bit-by-bit transmission is very slow. If a general bus connection is used, the component to which the transmission is directed must first be addressed before the data protocol can be transmitted. Particularly in time-critical data transmissions, this system is generally unsatisfactory, since the addressing requires a relatively long period of time.

THE INVENTION

Accordingly, it is an object to transmit data without consuming extra time in addressing the component to which the data are directed.

Briefly, a master processor and a slave processor are interconnected by a parallel data bus, with buffer memories, such as latches, interposed. A toggle flip-flop is connected to the interrupt input of the slave processor in such a way that merely placing a specific instruction (i.e. command + data) on the bus simultaneously notifies the slave processor to prepare for the exchange of data, thereby saving time. The data are transmitted in a predetermined sequence. One advantage is that, if the READ or WRITE commands of the microprocessor are used as the specific signals, the transmission is particularly rapid.

A further advantage is that very few additional electrical components and connections are necessary. Still further, it is desirable for one of the microprocessors to generate a signal at the end of the transmission. Thereby, the signal transmission to the receiving microprocessor can be verified, and the possibility of transmitting subsequent signals is created.

The formation of the specific signals, particularly the READ- or WRITE-signals, is accomplished by a circuit component, to whose output signal the slave microprocessor can be connected. Thereby, the data transmission is achieved with a minimum of effort. The end of each transmission is preferably signaled over an interrupt line. Commitment of additional circuitry for this purpose is thus rendered unnecessary.

DRAWINGS

Further features and advantages of the invention will be apparent from the drawings, in which:

FIG. 1 schematically illustrates an example of a data exchange apparatus in accordance with the invention;

FIG. 2a and 2b in combination are a flowchart of the operation of the apparatus of FIG. 1; and FIG. 3a, 3b and 3c represent a timing diagram of signals generated during operation of the apparatus.

DETAILED DESCRIPTION

Figure 1:
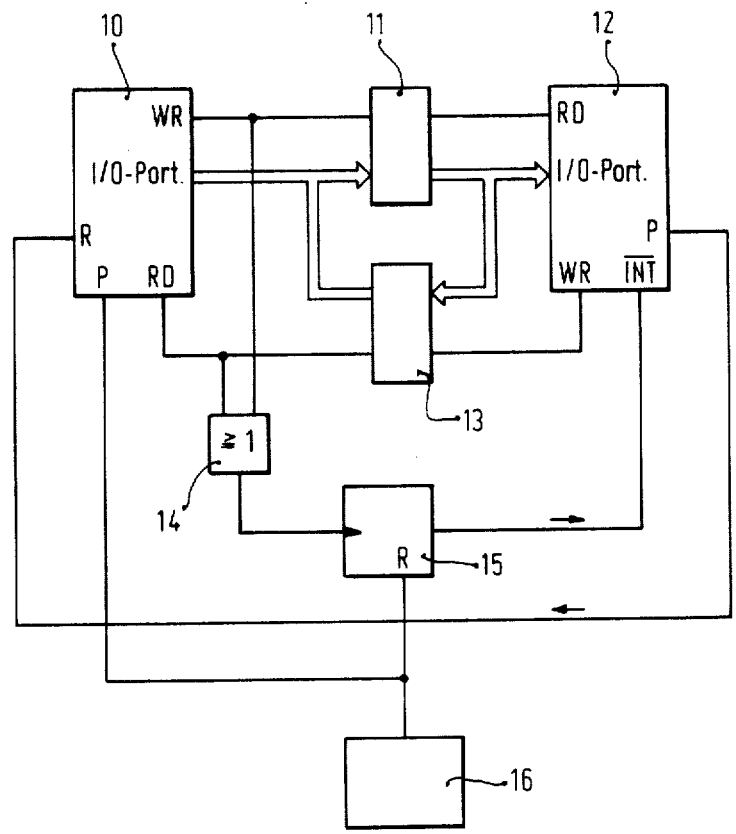

FIG. 1 shows a master microprocessor 10, whose Input/Output (I/O) port is connected to the input of a latch 11. A corresponding input of the latch 11 is also connected to the WRITE signal output WR of the master microprocessor 10. The WRITE signal output WR also connects to the input of an OR-gate 14. The output of the latch 11 leads to an I/O port of a slave microprocessor 12. The READ-signal output RD of this slave microprocessor 12 is also connected to the latch 11. A latch 13 is anti-parallel connected to the latch 11 and transfers signals from the I/O port of the slave microprocessor 12 to the I/O port of the master microprocessor 10. The WRITE-signal output WR of the slave microprocessor 12 is connected to the latch 13. Further, the READ-signal output RD of the master microprocessor 10 is connected to the latch 13. In addition, a connection from the READ-signal output RD of the master microprocessor 10 leads to a further input of the OR-gate 14. The output of the OR-gate 14 leads to an input of a toggle flip-flop 15.

The toggle flip-flop 15 changes its output condition upon each WRITE- or READ-command of the master microprocessor 10. The output of the toggle flip-flop 15 is connected to the interrupt input INT of the slave microprocessor 12. Further, a port P of the master microprocessor 10 is connected to a corresponding port P of the slave microprocessor 12.

Suitable microprocessors are the model 8051 from Intel Corp. The structure and instruction set of this microprocessor are described in publicly available literature, are well known to those skilled in the art, do not per se form part of the present invention, and therefore need not be detailed in the present application beyond the details shown in FIG. 1. Of course, other microprocessors can be used, especially others of the 8000 series from Intel.

The question of which I/O ports of the master microprocessor 10 or the slave microprocessor 12 are used for data input or output is a an arbitrary choice depending upon the programming of the microprocessors. Any desired signal line of the available port can be used as the port P. This also is determined by the programming and, as such, does not form part of the present invention. A reset circuit 16 is also provided and is activated upon interruption of power or other electrical disturbances. The reset circuit 16 is connected with the reset input of the master microprocessor 10 and with the toggle flip-flop 15. This prevents the toggle flip-flop 15 from assuming an undefined condition if a disturbance occurs.

Figure 2:
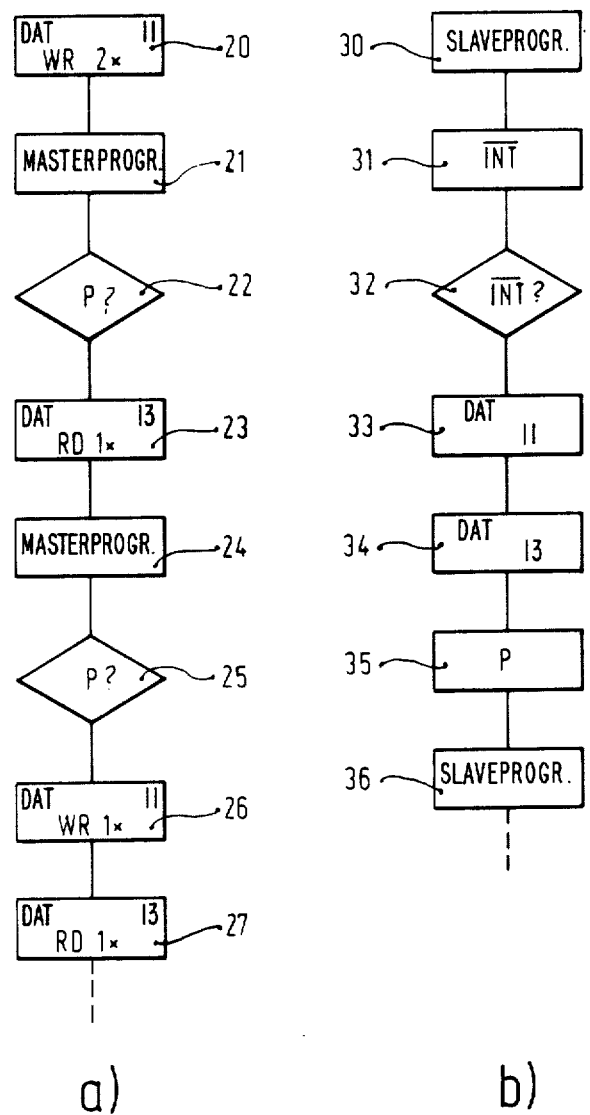

Operation, with reference to FIG. 2 and FIG. 3: These figures set forth the mode of operation of the data exchange, which may, if desired, comprise data transmission in only one direction. The microprocessor 10 serves as the master microprocessor and undertakes, for example, control tasks for an internal combustion engine of a motor vehicle. The magnitude and variety of the control tasks to be accomplished makes it necessary for the master microprocessor to transfer a portion of its processed output data to the slave microprocessor, so that the latter may take over the real-time output control of these quantities (e.g. sequential fuel injection). A portion of the calculations may also take place in the slave microprocessor. Further, the slave microprocessor can acquire a portion of the data required by the master microprocessor, do preliminary processing of it, and transfer it to the master microprocessor. So that the rapid processing speed of the two microprocessors is not wasted, the data transfer must also be accomplished very rapidly.

The master processor 10 has absolute priority over the data transmission, i.e. the master processor 10 calls up the data as needed or forwards them to the slave processor 12 as needed. The slave processor is controlled via its interrupt input, i.e. upon demand of the master processor, the slave processor interrupts whatever program it was running and transmits or receives the data demanded.

An important feature is that the data are transferred to and/or from the slave processor in the correct sequence. For this purpose, the data exchange must be commenced at a specific agreed or synchronized starting time. Thereafter, the data sequence is determined by the individual program steps, which are executed by the master processor 10. The aforementioned synchronization prevents incorrect data from ever being sent from slave processor 12 to master processor 10, even upon switching ON of the system, or upon resetting after a disturbance. Incorrect data may include not only incorrect bits, but also a string of correct bits which are transferred at an incorrect time or in an incorrect context, e.g. as a fragment of a longer bit string which would be interpreted differently.

FIG. 2a is an example of a flowchart for the operation of the master processor 10, while FIG. 2b is a flowchart for the operation of slave processor 12, during data exchange. To commence data exchange, at step 20, the master processor 10 sends the same data string twice to the latch 11, by means of a WRITE command. Thereafter, at step 21, the master processor continues with its master program. During execution of the twice-iterated WRITE command, the OR-gate 14 toggles the flip-flop (FF) 15 twice. FF 15 thus functions like a register. This produces the signal 40 shown in FIG. 3a. The first WRITE command causes the falling edge, while the second WRITE command causes the rising edge. The interrupt in slave microprocessor 12 is triggered, in the example described, by the falling edge of the interrupt signal. The slave microprocessor 12, which meanwhile has been executing its slave program, as shown at step 30 of FIG. 2b, stops its work in progress upon receipt at step 31 of the interrupt signal. It then switches to execution of a special interrupt program which controls the data exchange by the slave processor. FIG. 3b depicts the respective switch-over points as vertical lines. The time between the interrupt signal and the switch-over is allotted for the slave processor to complete execution of the instruction then in progress.

As soon as the slave processor 12 has switched over to the interrupt program, it checks, at step 32, to see what logic state or condition the interrupt line is in. Extra connecting lines are not necessary for this purpose, since the interrupt line can directly accessed. If this interrupt line, after the switch-over, is in the "logical 1" state, this means that the master processor has generated the first two READ or WRITE commands of a data transmission cycle. The slave processor recognizes, from this, that it must start the transmission to receive the first data word. At step 33, it retrieves the data which were written into the latch 11 by the master processor 10 at step 20. At step 34, data are written into the latch 13. After the end of the data exchange, the slave processor 12 generates a signal at port P which comprises a change in the original logic condition there, as shown in FIG. 3c. The first data exchange is completed.

After a period of time determined by the master program, the master processor 10 checks by an interrogation signal, at step 22, the port P. If its logic state has changed, the master processor 10 knows that the slave processor 12 has finished its work and has received or transmitted the data required. Since the last data handled were written by the slave processor 12 into the latch 13, the master processor 10 retrieves the data from the latch 13, by generating, at step 23, a READ command directed to the latch 13. This READ command acts via the OR-gate 14 to toggle the flip-flop 15, as shown in FIG. 3a by reference numeral 44.

While the master processor 10, after transfer of the data at step 24, continues with its master program, the toggling of the flip-flop 24 generates a new interrupt. The running of the slave program in interrupted, at step 36, by a switch-over to the interrupt routine or program. The slave processor 12 recognizes, from the fact that the interrupt line is in a "logical 0" state, that not the first data word, but rather the second data word is to be read out. It is easy to determine, in the slave processor 12, which data word is to read or written by providing a programmed counter which counts the switchovers since the synchronization. As described above, data is read into or out of the latches 11 or 13. Upon completion of the READ procedure, the port P is again toggled, as shown in FIG. 3c.

The timing diagrams in FIG. 3 illustrate that, after the initializing twice-iterated WRITE command (40) and the following single WRITE or READ command (44), a READ command and a WRITE command follow alternately. If data are to be read in at step 25, for example, the rising edge of the pulse 41 triggers the reading of data into the latch 11 as the result of a WRITE command, while the falling edge triggers reading of data out of the latch 13.

Since an interrupt is triggered only by a pulse going from 1 to 0, the single WRITE command at step 26 does not cause an interrupt; rather, the interrupt occurs only after the following READ command at step 27, after the master processor 10 has verified, at step 25, that the slave processor 12 completed its former data transmission. If a complete data packet has been transmitted, it is possible, after a certain lapse of time, to set the interrupt line and the port line P to a "logical 1" state, as shown at the right side of FIG. 3. This setting "high" triggers no further function, since, as previously mentioned, an interrupt occurs only upon a transition from "logical 1" to "logical 0".

An example will show that the method of the present invention permits rapid and secure transmission of data packets. The beginning of the data packet is recognized by the twice-iterated WRITE command. How one flags the beginning of the data transmission is somewhat arbitrary. Instead of a twice-iterated WRITE command, it would be equally possible to use a double READ command from microprocessor 10 or alternating WRITE and READ commands. The master microprocessor 10 writes data into the latch 11 and reads them out of latch 13. These can, for example, be "logical 0's" if no data have yet been written into latch 13. This must of course be a convention established by the program.

It is readily apparent that the above-described alternating WRITE and READ commands could be replaced by a READ and WRITE or a double READ or a double WRITE. This is dependent upon the application. It is also apparent that the interrupt function need not necessarily be triggered over the interrupt input, but could be triggered, for example, by controlling another arbitrarily selected port.

The significant feature is that, through a special structuring of the first signal, a synchronization between the two microprocessors 10 and 12 occurs and that the following data transmission is in a predetermined pattern, i.e. the data packet's sequence has been defined. It is also advantageous that the inputs and outputs already provided on the microprocessors can be used for data transmission purposes, thereby minimizing the number of necessary connections.

Those skilled in the art will appreciate that numerous changes and modifications are possible, within the scope of the inventive concept.

We claim:

1. A method of exchanging data in a control system of an automotive vehicle between a master processor (10) and a slave processor (12) of said control system with a minimum of extra data transmitted and time consumed, comprising the steps of generating a synchronous timing reference for both said master processor (10) and said slave processor (12);

generating in said master processor a signal train in form of write or read commands, followed by said data, wherein the data are provided in form of data words, in a predetermined pattern and sequence;

loading the write or read command and the data in said sequence into a first latch (11);

recognizing, in the latch, the presence of the write or read command;

transmitting to said first latch, a second time, the write or read command;

toggling a two-command recognition circuit (15) or register in dependence on recognition of the second write or read command;

generating an interrupt signal (40) upon such recognition of two commands, and coupling said interrupt signal to an interrupt input of said slave processor (12) to thereby initialize (31, 32), said slave processor for the reception of a first data word;

transferring (33) said first data word from said first intermediate latch (11) into said slave processor (12);

signalling (P, 35) by said slave processor said master processor (10) that said slave processor (12) has received the first data word;

generating a single write or read command to thereby provide a command to the recognition circuit or register (15) and thereby changing the status of the interrupt line of said slave processor to initialize said slave processor for the reception of a further data word;

transferring (23) said further data word to said slave processor (12); and completing said data transmission by setting said recognition circuit (15) or register to the status before said first pair of write or read commands.

2. The method according to claim 1, including the steps of signalling (P, 35) said master processor (10) each time said slave processor (12) has received a data word, and further signalling the master processor that the slave processor has received the final data word of the transmission.

3. The method according to claim 2, wherein the end of the transmission is signalled by alternate read and write commands.

4. The method according to claim 1, further comprising the step of (FIG. 3) counting, in said slave processor (12) the number of switch-over or interrupt signals received after the first interrupt signal.

5. The method according to claim 1, further comprising the step of returning (36) said slave processor (12) to execution of a slave program after said exchange of data, which slave program the slave processor executing prior to said data exchange.

6. The method according to claim 1, including the step of generating, in the slave processor, a write command and data in form of at least one data word;

loading the write command and said at least one data word from the slave processor (12) into a second latch (13);

generating, in the master processor (10), an interrogation signal and coupling said interrogation signal to the slave processor (12) to determine if the slave processor has received said data and, selectively, read data into said second latch, said interrogation signal including the first recognition command to the recognition circuit or register (15).

7. The method according to claim 6, wherein said first recognition command comprises a "read" command directed by said master processor (10) to said second latch (13), and including the step of reading said at least one data word from the second latch into the master processor (10).

8. The method according to claim 1, wherein said data words comprise control data for different operating parameters of an engine of the vehicle.

9. The method according to claim 1, wherein at least one of said data words represents data controlling injection of fuel to an internal combustion engine of the vehicle.

10. The method according to claim 1, wherein the step of recognizing the presence of the first write or read command and the step of recognizing the second write or read command comprises recognizing respectively opposite flanks or edges of a pulse (40).

11. System for exchanging of data in a control system of an internal combustion engine, between a master processor (10) and a slave processor (12), said data comprising data trains in form of write or read commands, followed by data words in a predetermined time or sequence, wherein said slave processor (12) has an INTERRUPT input;

the master processor has an input/output port for transmitting and receiving said data trains, respectively;

said slave processor (12) has an input/output port for receiving and transmitting the data trains, respectively;

and at least one latch (12) is provided, forming a buffer memory, coupled between the input/output ports of the master processor and the slave processor, and a recognition circuit or register (15) is provided, connected to and responsive to two commands in said data trains, and forming at least one of: write commands; read commands, and means for controlling the INTERRUPT input of said slave processor (12) to interrupt processing operation by the slave processor when two commands are received and recognized by said recognition circuit or register (15).

12. The system according to claim 11, including resetting means (16) coupled to the master processor (10) and said recognition circuit or register (15) for placing said recognition circuit or register in a predetermined condition upon control by said master processor.

13. The system according to claim 11, further including a check line connection (P-R) to permit signalling between the slave processor (12) and the master processor (10) that a data word has been read into the slave processor from said at least one latch.

14. The system according to claim 11, further including a second latch (13) coupled to receive transmitted data from said slave processor and further coupled to said master processor (10) to permit reading of data from the slave processor into the second latch, and read-out of data from said second latch into the master processor, said data being preceded by respective "read" commands from the master processor upon read-out by the master processor, said command forming one of the respective commands controlling the INTERRUPT input from the recognition circuit or register (15).

15. A method of exchanging data in a control system of an automotive vehicle between a master processor (10) and a slave processor (12) of said control system with a minimum of extra data transmitted and time consumed, comprising the steps of generating in said master processor (10) a signal train in form of a pair of write commands followed by data words in a predetermined patter and sequence;

loading the write commands and the data of said data words in said sequence into a latch (11);

recognizing presence of the two write commands;

toggling a recognition circuit or register (15) in dependence on recognition of the second write command;

generating, upon such recognition, an interrupt signal (40) and coupling said interrupt signal to an INTERRUPT input of said slave processor (12) to thereby initialize (31, 32) said slave processor for the reception of a first data word;

transferring said first data word from said latch (11) into said slave processor (12);

signalling (P, 32) to said master processor (11) that said slave processor has received the first data word;

changing the status of the interrupt line by a single write command;

transferring further data words to said slave processor including pairs of write commands; and completing said data transmission by setting said recognition circuit or register (15) to a rest status thereof and ready to receive a further pair of write commands.

16. The method according to claim 15 wherein said signalling step from the slave processor (12) to the master processor (10) that the slave processor has received the first data word forms one of the pairs of commands for said two-command recognition or register circuit (15).

* * * * *